US009538560B1

(12) United States Patent
Velandy et al.

(10) Patent No.: US 9,538,560 B1
(45) Date of Patent: Jan. 3, 2017

(54) PROTOCOL CONFIGURATION OPTIONS (PCOS) IN UNTRUSTED WLAN ACCESS (75) Inventors: Rajesh Velandy, Nashua, NH (US); Aeneas Dodd-Noble, Andover, MA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 324 days.

(21) Appl. No.: 13/614,394

(22) Filed: Sep. 13, 2012

(51) Int. Cl.
*G06F 15/16* (2006.01)
*H04W 76/02* (2009.01)
*H04W 12/04* (2009.01)

(52) U.S. Cl.
CPC ............. *H04W 76/02* (2013.01); *H04W 12/04* (2013.01)

(58) Field of Classification Search
None
See application file for complete search history.

(56) References Cited

U.S. PATENT DOCUMENTS

| 7,873,003 | B2* | 1/2011 | Baek | H04L 29/06027 370/329 |
| 8,270,978 | B1* | 9/2012 | Faccin | H04W 36/0016 370/331 |
| 2013/0058275 | A1* | 3/2013 | Melia | H04W 60/005 370/328 |
| 2013/0290722 | A1* | 10/2013 | Kall et al. | 713/171 |

FOREIGN PATENT DOCUMENTS

| WO | WO 2011104149 A1 * | 9/2011 | H04W 4/00 |
| WO | WO 2012095184 A1 * | 7/2012 | H04L 12/04 |

OTHER PUBLICATIONS

ETSI TS 129 060 V.8.6.0. Digital cellular telecommunications system (Phase 2+); Universal Mobile Telecommunications System (UMTS); LTE;General Packet Radio Service (GPRS); GPRS Tunnelling Protocol (GTP) across the Gn and Gp interface. 3GPP TS 29.060 version 8.6.0 Release 8. 2009. pp. 22-27.*

* cited by examiner

*Primary Examiner* — Joseph E Avellino
*Assistant Examiner* — Tsung Wu
(74) *Attorney, Agent, or Firm* — Patent Capital Group (57) ABSTRACT Systems and methods are described for exchanging network protocol configuration option (PCO) parameters for a mobile device in a communications network (IP) address to enable communication with the mobile device with untrusted WLAN access. In one embodiment, the PCO is passed in a first interface from mobile device to first gateway and passed as is over a second interface to a packet gateway. In a second embodiment, the first interface carries information used in PCO in configuration options/Information elements, such as configuration option in IKE in case of ePDG. The serving gateway, such as an ePDG, creates PCO and extracts the information from first interface and then sends PCO over the second interface. In the response path the PCO response is used to fill in information that is sent in the first interface.

22 Claims, 8 Drawing Sheets

| 3GPP Protocol Configuration Options (PCO) | |
|---|---|
| MS to Network Direction: | Network to MS Direction: |
| •0001H (P-CSCF IPv6 Address Request);<br>•0002H (IM CN Subsystem Signaling Flag);<br>•0003H (DNS Server IPv6 Address Request);<br>•0005H (MS Support of Network Requested Bearer Control indicator);<br>•0007H (DSMIPv6 Home Agent Address Request;<br>•0008H (DSMIPv6 Home Network Prefix Request);<br>•0009H (DSMIPv6 IPv4 Home Agent Address Request);<br>•000AH (IP address allocation via NAS signalling);<br>•000BH (IPv4 address allocation via DHCPv4);<br>•000CH (P-CSCF IPv4 Address Request);<br>•000DH (DNS Server IPv4 Address Request);<br>•000EH (MSISDN Request);<br>•000FH (IFOM-Support-Request);<br>•0010H (IPv4 Link MTU Request); and<br>•FF00H to FFFFH reserved for operator specific use. | •0001H (P-CSCF IPv6 Address);<br>•0002H (IM CN Subsystem Signaling Flag);<br>•0003H (DNS Server IPv6 Address);<br>•0004H (Policy Control rejection code);<br>•0005H (Selected Bearer Control Mode;<br>•0007H (DSMIPv6 Home Agent Address) ;<br>•0008H (DSMIPv6 Home Network Prefix);<br>•0009H (DSMIPv6 IPv4 Home Agent Address);<br>•000CH (P-CSCF IPv4 Address);<br>•000DH (DNS Server IPv4 Address);<br>•000EH (MSISDN);<br>•000FH (IFOM-Support);<br>•0010H (IPv4 Link MTU); and<br>•FF00H to FFFFH reserved for operator specific use. |

PROTOCOL CONFIGURATION OPTIONS (PCOS) IN UNTRUSTED WLAN ACCESS

FIELD OF THE DISCLOSURE

This disclosure relates generally to a system and method for exchanging network protocol configuration parameters for a mobile device and providing other network services in a communications network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many mobile devices, including, for example, satellite communications systems, portable digital assistants (PDAs), laptop computers, and mobile devices (e.g., cellular telephones, user equipment). Such devices can connect to a network (e.g., the Internet) as long as the user is within range of such a wireless communication technology. Mobile devices are assigned an address that serves as a unique identifier within the network.

DESCRIPTION OF EXAMPLE EMBODIMENTS

Overview

Systems and methods are described for exchanging network protocol configuration option (PCO) parameters for a mobile device in a communications network (IP) address to enable communication with the mobile device with untrusted WLAN access. In one embodiment, the PCO is passed in a first interface from mobile device to first gateway and passed as is over a second interface to a packet gateway. In a second embodiment, the first interface carries information used in PCO in configuration options/Information elements, such as configuration option in IKE in case of ePDG. The serving gateway, such as an ePDG, creates PCO and extracts the information from first interface and then sends PCO over the second interface. In the response path the PCO response is used to fill in information that is sent in the first interface.

EXAMPLE EMBODIMENTS

A large number of devices, including computers, cell phones, printers, and even refrigerators and cars, can communicate amongst themselves over communications networks. The communications network associates each device with a unique address so that, just as one person would call another person by dialing the other person's phone number, one device (i.e., requestor) can communicate with another device (i.e., recipient) by sending a communication request to the recipient's address. The Internet Protocol (IP) is the principal communications protocol for identifying hosts and routing packets of data from a requestor host to a recipient host across one or more IP-connected networks. IP addresses are numerical labels assigned to each network device that uses IP to communicate. Although IP addresses are binary numbers, they are usually stored in text files and may be displayed in human-readable notations. Two versions of the IP addressing scheme are currently in use: Internet Protocol version 4 (IPv4) and Internet Protocol version 6 (IPv6), which is intended to succeed IPv4.

In a certain type of network connection, the IP address assignment may be static. In other words, the IP address assigned to each device does not change over time. Therefore, once a requestor identifies the IP address of a recipient, the requestor can use the same IP address to communicate with the recipient at any point in time. A "static" network essentially maintains a single, permanent IP address database (or a single, permanent "telephone book") to keep track of which device is associated with which IP address. Despite the simple bookkeeping strategy, a static network may be impractical for large networks because the total number of devices that can be attached to a static network is limited by the number of bits used to represent an IP address, which is 32 bits for IPv4 and 128 bits for IPv6.

One way to address the number of IP addresses is to dynamically assign IP addresses. Suppose that a device is assigned an IP address, but the device later detaches from the network. Under a dynamic IP address allocation scheme, the network can recycle the IP address assigned to the detached device and re-assign the recycled IP address to a different, attached device. A network implementing the dynamic IP address allocation scheme is called a dynamic network. To keep track of which device is associated with which IP address, a dynamic network can maintain a time-dependent IP address database (or a time-dependent "telephone book") that is updated to reflect the most current network configurations. When a requestor wants to communicate with a recipient, the requestor can consult the IP address database to determine the recipient's IP address and use that IP address to establish communication with the recipient.

A drawback to using an address database in a dynamic network is that it needs to be updated every time a new device is added to or detached from the network. Because a network is often associated with a large number of devices, communications overhead associated with updating the address database can become difficult. This update is wasteful because some entries in the address database may not even be requested. Furthermore, whenever a requestor wants to communicate to a recipient, the requestor needs to consult the address database, even if the requestor communicated with the recipient not too long ago. The communication bandwidth overhead and the delay overhead of using an address database in a dynamic network can be significant when compared to a static network, which does not have to update the address database as often.

Some of these drawbacks can be addressed by using a network address translation (NAT) scheme. In a NAT scheme, a network is divided into two tiers: a public network and a private network. For example, the public network can be the Internet, and the private network can be a Local Area Network (LAN). Each device in a public network is assigned an IP address that is unique across the entire public network. This public IP address is often assigned dynamically, but can be assigned statically. On the other hand, each device in a private network is assigned a unique, static IP address that does not change over time. Therefore, if devices in the same private network communicate with each other frequently, each device can cache the IP address of the counter party and use the cached IP address for future communications. This process would not be done with a dynamic network. The static IP assignment within the private network can eliminate communication bandwidth overhead and delay overhead associated with a dynamic network. However, as a compromise, the IP address of the private network is unique only within the private network. In other words, this IP address of the private network cannot be used to communicate with devices outside of the private network because another device could be using the same IP address outside of the private network. To enable communication between devices residing in different private networks and the public network, private networks are interfaced to the public network through NAT devices or proxy servers, which associate local IP addresses with public IP addresses that can be used for two-way communication across a public network and private networks. The NAT devices track these associations or NAT bindings in an address translation table.

These network characteristics are also applicable to a mobile IP network. A mobile IP network provides Internet services to mobile devices such as cell phones. A mobile IP network assigns an IP address to each mobile device. The assigned IP address can be a static IP address or a dynamic IP address, depending on how the mobile IP network manages its IP addresses. The assigned IP address can be a public IP address that is unique on the entire public network or it can be a local IP address that is unique only within a private network. A mobile IP network can dynamically allocate IP addresses for efficient resource utilization.

When a mobile device connects to a mobile IP network, it must request an IP address and associated IP configuration parameters to be assured of successful service. For mobile IPv6 networks, the Third Generation Partnership Project (3GPP) has defined a mechanism called Protocol Configuration Options (PCO) to negotiate the IP configuration parameters between a mobile device and the gateway to an Evolved Packet Core (EPC), that is, the core network components of 3GPP's Long Term Evolution (LTE) wireless communication standard. The PCO exchange takes place between the mobile device and the Packet Data Network Gateway (PGW), which provides connectivity from the mobile device to the EPC. PCO is not interpreted by intermediate network elements between the packet gateway that communicates with the EPC and the mobile device, such as the evolved Data Packet Gateway (ePDG), the Serving Gateway (SGW), and the Mobility Management Entity (MME).

PCO accounts for IP configuration parameters, such as the mobile device's Domain Name System (DNS) server address, which is mapped to the device's IP address or addresses. A DNS server implements DNS to translate an Internet domain name to an IP address. More particularly, the DNS can be used to map domain names of hosts and clients on the Internet to their corresponding IP addresses. Such translation enables the mobile IP network to attach easy-to-remember domain names (e.g., "domainname.org") to difficult-to-remember IP addresses (e.g., "200.140.130.120"). Since a central list of domain name-IP address mappings would be impractical, such lists are maintained by a hierarchical database system distributed throughout the Internet in various DNS servers. Each domain has at least one authoritative name server that stores information about that domain and the name servers of any sub-domains and responds to queries against its database regarding, for example, address records, name server records, and mail exchanger records. By way of example, a client typically sends a DNS query to a DNS server that includes a hostname with an indication that an IP address is requested. The DNS server then returns an IP address associated with the hostname. DNS has important applications beyond IP address mapping. For example, DNS records help support email exchange and software updates. In order to correspond to the correct EPC-assigned IP addresses, the DNS server addresses should be assigned by the PGW and not an intermediate network element.

Figure 1:
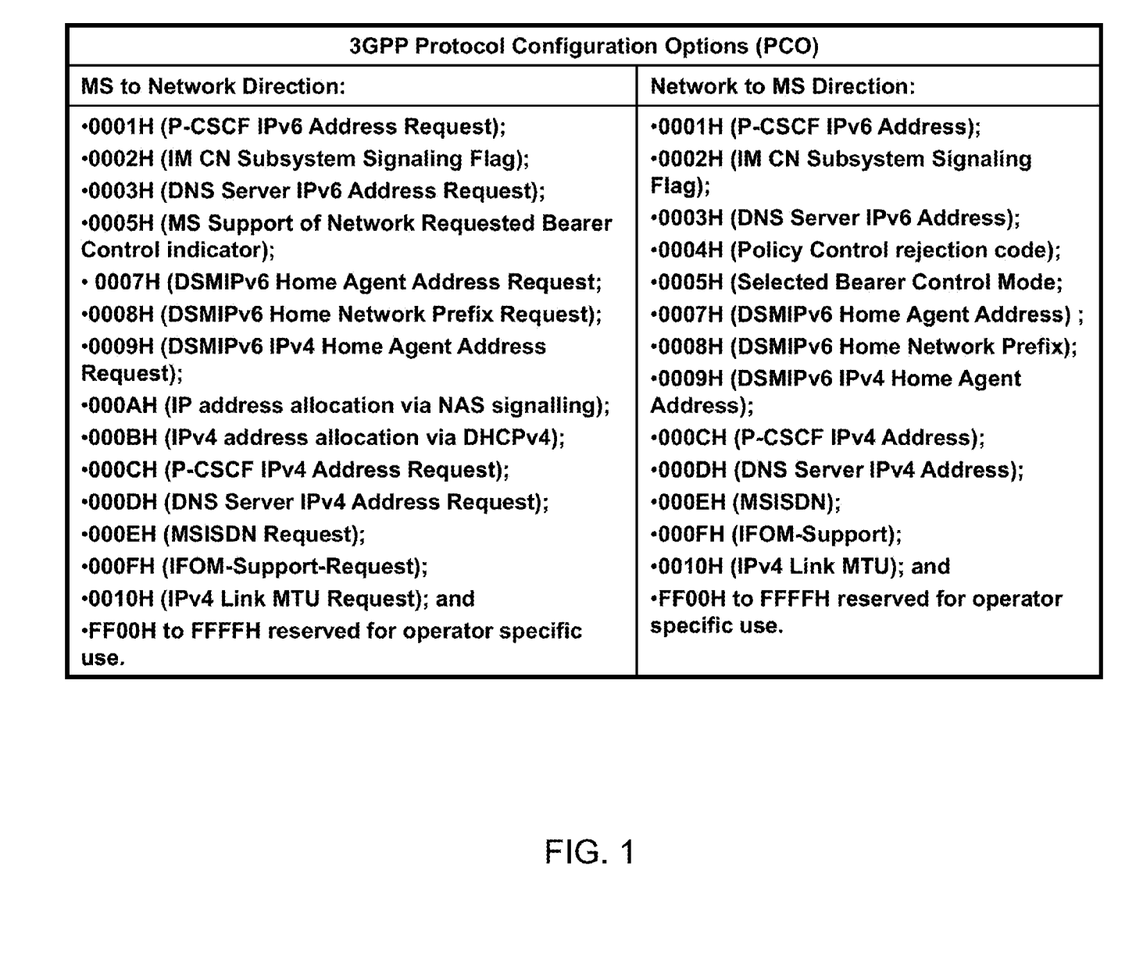
FIG. 1 shows network protocol configuration parameters available to be exchanged between a communication network and a mobile device using Protocol Configuration Options (PCO) in accordance with some embodiments.

PCO is an accepted means to request DNS server addresses, but PCO is also capable of accommodating additional requests. For example, PCO can be used to exchange Proxy-Call Session Control Function (P-CSCF) addresses, which are used for a mobile device to initiate IP network registrations and sessions. PCO also supports additional authentication mechanisms, such as Password Authentication Protocol (PAP) and Challenge-Handshake Authentication Protocol (CHAP). A more expansive listing of the IP configuration parameters exchanged via PCO is set out in FIG. 1.

Mobile devices may connect to the EPC using 3GPP access technologies, including GPRS, UMTS, EDGE, HSPA, LTE, and LTE Advanced. Mobile devices may also connect to an EPC using access technologies that the 3GPP has not specified, such as CDMA2000 or a wireless local area network (WLAN), often known commercially as Wi-Fi. Network operators classify these non-3GPP access technologies with different security mechanisms. Mobile devices utilizing trusted access technologies, like CDMA2000, are allowed to interface directly with the network, whereas mobile devices utilizing untrusted access technologies, such as Wi-Fi and femtocell, are connected to the network via an ePDG, which provides additional security mechanisms.

PCO is not supported for untrusted WLAN or Wi-Fi access model. An untrusted WLAN-connected mobile device is typically assigned an IP address by the EPC due to the device's connection to the PGW through the ePDG, and that IP address will be passed from the PGW to the ePDG over the Proxy Mobile IP/GPRS Tunneling Protocol (PMIP/GTP)-based S2b interface. Meanwhile, the SWu interface between an untrusted WLAN-connected mobile device and the ePDG can be based on the Internet Key Exchange version 2 (IKEv2) protocol. As defined in RFC 5996, IKEv2 establishes a security association via the sharing of security attributes, such as parameters for the network data to be passed over the connection, between network entities like a mobile device and the ePDG. Among these attributes, IKEv2 supports assignment of IPv4 and IPv6 addresses as configuration attributes in a configuration payload, which is used to exchange configuration information between IKEv2 network entities.

Thus, IKEv2 allows an IP address to be passed from the ePDG to a mobile device over the SWu interface; however, the associated IP configuration parameters available via PCO also should be assigned by the PGW and not the ePDG or the Wi-Fi access point. For example, the PGW assigns the DNS server address and the P-CSCF addresses for IMS registration, but there is no standard mechanism to directly pass these values from the PGW to the mobile device. Without broader PCO support in the pathway, the 3GPP EPC lacks the ability to directly assign DNS and P-CSCF addresses or other essential IP configuration parameters for mobile devices in the currently-defined untrusted WLAN call flow. The disclosed systems and methods allow IP configuration parameters to be provided to a mobile device and equate mobile device capabilities regardless of the network access technology, including untrusted access.

In one embodiment, an ePDG is enhanced to imitate a PCO exchange based on the existing configuration attributes in the configuration payload in its IKEv2-based SWu interface with a mobile device. In another embodiment, the configuration payload of IKEv2 is modified to include the IP configuration parameters, such as new configuration attributes. In yet another embodiment, IKEv2 may be modified to include IP configuration parameters in a new PCO payload.

In an embodiment where the ePDG imitates a PCO exchange, the ePDG may create a PCO option to request one or more IP configuration parameters and send the request to the PGW over the S2b interface. When the ePDG receives a PCO response from the PGW, the ePDG may extract the IP configuration parameter information and forward it to a mobile device as the appropriate configuration attributes in the configuration payload over the IKEv2-based SWu interface. For example, the ePDG may create a PCO option to request a DNS server address from the PGW over the S2b interface then extract the DNS server address information from the PGW's PCO response and provide it to a mobile device over the SWu interface.

Embodiments where the ePDG imitates a PCO exchange have a benefit in that neither the IKEv2 protocol on the SWu interface and the protocols on the S2b interface do not need to be modified. Imitative PCO embodiments also improve interoperability with standard-based IKEv2 client implementations. On the other hand, imitative embodiments are only as effective as the defined IKEv2 protocol. Currently, IKEv2 only supports IPv4 and IPv6 DNS server address assignments so the imitative PCO exchange is limited to IPv4 and IPv6 DNS server address assignments. However, real 3GPP PCO exchange is used for more parameters than just DNS server address assignments. As long as the currently-defined IKEv2 configuration attributes are limited to DNS server addresses, imitative PCO embodiments will not have full parity with 3GPP PCO exchange features, such as P-CSCF addresses.

In another embodiment, the configuration payload or another existing payload of the IKEv2 protocol may be redefined to include network protocol configuration parameters as new configuration attributes. By expanding the current set of attributes to include DNS server addresses, P-CSCF addresses, and other network protocol configuration parameters, PCO may be sent between a mobile device and the ePDG over the IKEv2-based SWu interface and then carried to the PGW over the S2b interface. Embodiments that feature additional IKEv2 attributes may offer full parity with real 3GPP PCO exchange features. Another benefit of supplementing the attributes is the limited impact on the IKEv2-based SWu interface, provided the mobile device understands the new network protocol configuration parameters. Embodiments that feature an additional IKEv2 attributes could require changes to the currently-defined IKEv2 protocol so that both the mobile device and the ePDG agree on the new exchange parameters.

In yet another embodiment, IKEv2 may be modified to include network protocol configuration parameters in a new PCO payload. By expanding the IKEv2 protocol to include a new payload comprising DNS server addresses, P-CSCF addresses, and other network protocol configuration parameters, PCO may be sent between a mobile device and the ePDG over the IKEv2-based SWu interface and then carried to the PGW over the S2b interface. As with additional parameters in the configuration payload, embodiments that feature a new IKEv2 PCO payload also offer full parity with real 3GPP PCO exchange features and limit the impact on the IKEv2-based SWu interface, provided the mobile device understands the network protocol configuration parameters in the new payload. Still, embodiments that feature a new IKEv2 PCO payload will also require changes to the IKEv2 protocol so that both the mobile device and the ePDG agree on the new exchange parameters.

Figure 2:
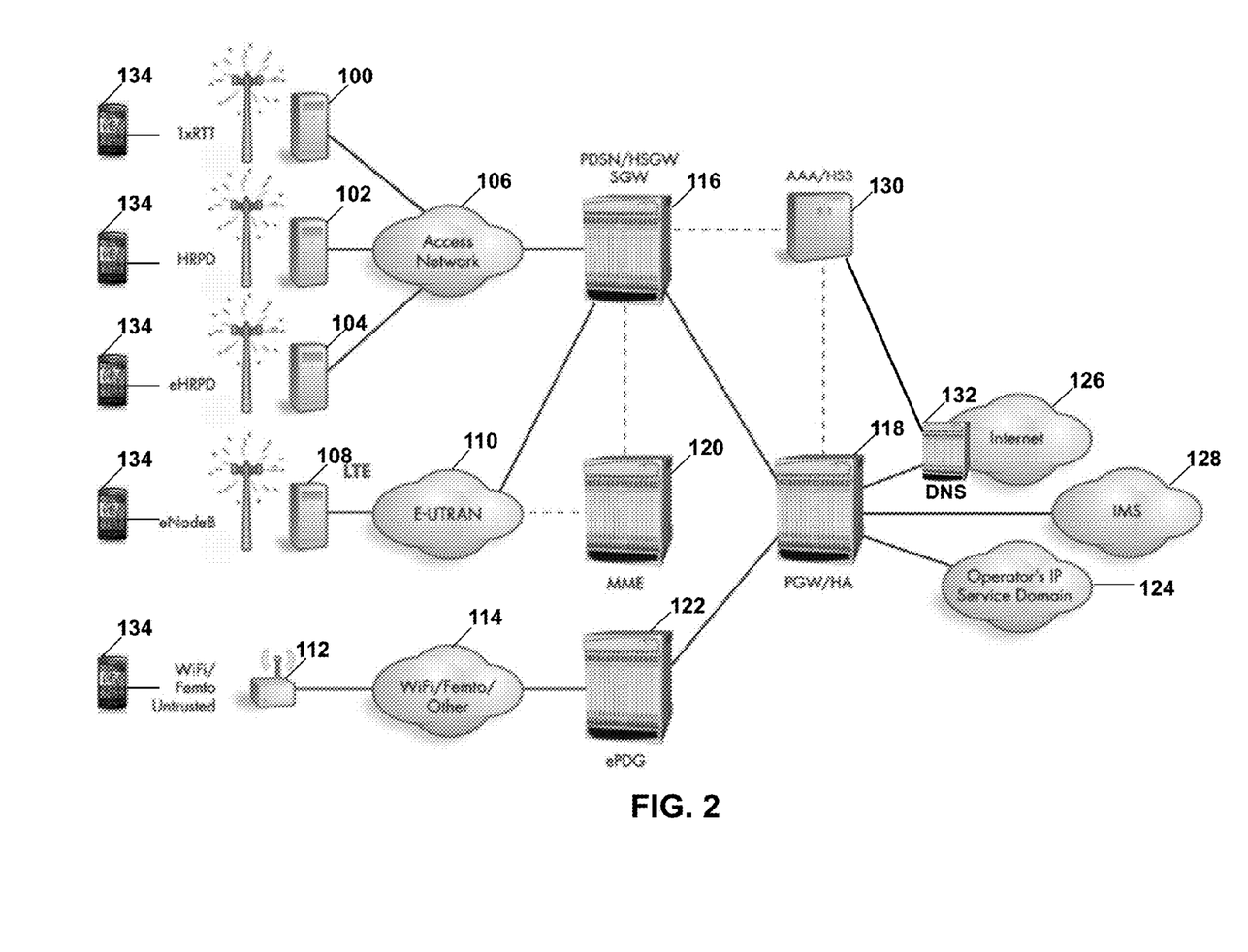
FIGS. 2 and 3 illustrate communications networks including a long term evolution (LTE) topology in accordance with some embodiments.

FIG. 2 illustrates a communications network that implements the exchange of network protocol configuration parameters for a mobile device in accordance with certain embodiments. FIG. 2 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Untrusted non-3GPP radio access technologies such as Wi-Fi, WiMAX, femtocell, or any other radio spectrum technology can use transceiver 112 to connect to the network using a broadband or other access network.

The access network 106 can communicate with an access gateway 116 that can implement one or more functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA) and a mobility management entity (MME) 120. On the access network side, the anchor gateway 118 can also communicate with an evolved packet data gateway (ePDG) 122 which provides connectivity to the untrusted non-3GPP transceiver 112. On the packet core side, the anchor gateway can communicate with the operator's IP service domain 124, the internet 126, IP multimedia subsystem (IMS) 128, and a Domain Name System (DNS) server 132. An authentication, authorization, and accounting (AAA) server/home subscriber server (HSS) 130 can communicate with the access gateway 116, the anchor gateway 118, or both.

The DNS server 132 implements DNS to map domain names of hosts and clients on the Internet to their corresponding IP addresses. Since a central list of domain name-IP address mappings would be impractical, such lists are often distributed throughout the Internet in various DNS servers. By way of example, a client typically sends a DNS query to a DNS server that includes a hostname with an indication that an IP address is requested. The DNS server would then return an IP address associated with the hostname. The DNS server 132 can communicate with the HSS 130 over any one of the following interfaces: a Diameter Sh interface, an interface that implements standardized protocols including a lightweight directory access protocol (LDAP) and an Authorization, Authentication, and Accounting (AAA) protocol, or a proprietary interface between the DNS server 132 and the HSS 130.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1x and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

In some embodiments, the exchange of network protocol configuration parameters for a mobile device can be implemented on the ePDG 122. The ePDG 122 is responsible for interworking between the EPC and untrusted non-3GPP access technologies such as a Wi-Fi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 3:
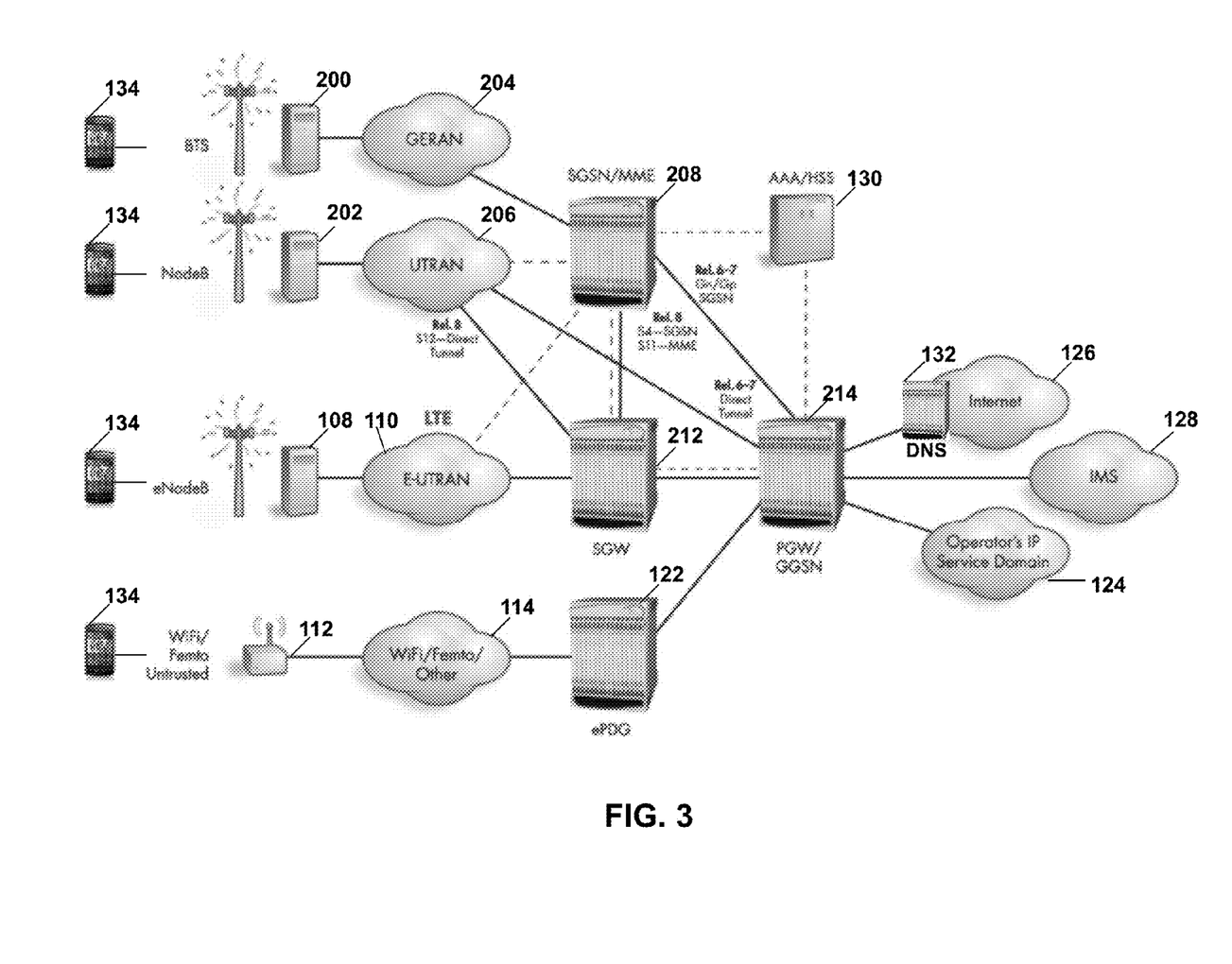

FIG. 3 illustrates a communications network that implements the exchange of network protocol configuration parameters for a mobile device in accordance with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

Figure 4:
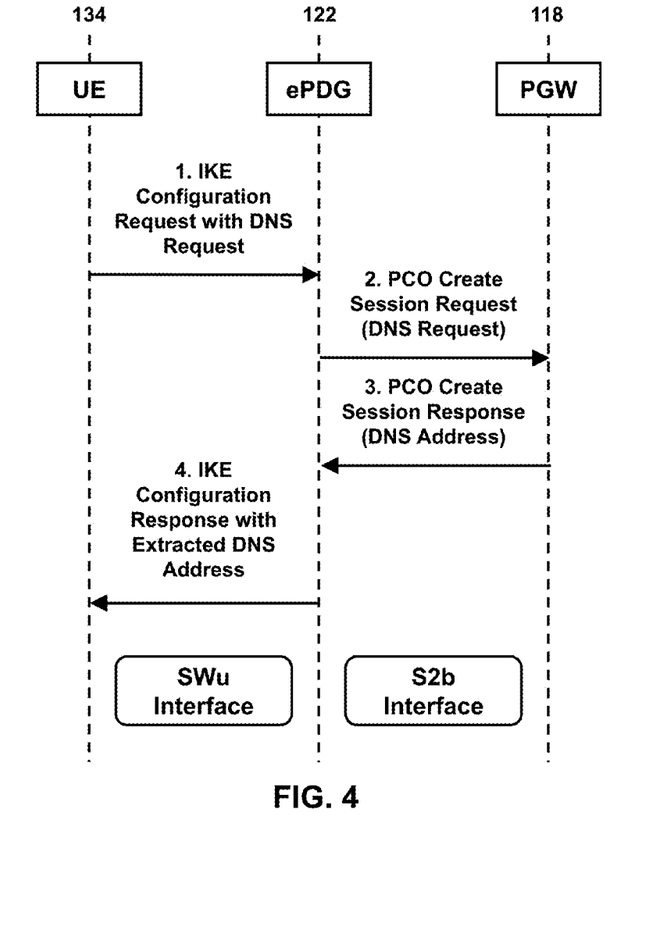
FIGS. 4 and 5 illustrate systems and methods for exchanging network protocol configuration parameters in accordance with certain embodiments.

FIG. 4 illustrates systems and methods for negotiating network protocol configuration parameters in accordance with certain embodiments, using a DNS request as an example. In step 1, the UE 134 sends a request for the DNS server address to the ePDG 122 over the IKEv2-based SWu interface. In step 2, the ePDG 122 imitates a PCO exchange between the UE 134 and the PGW 118 by creating a PCO option to request one or more IP configuration parameters and sending the request to the PGW 118 over the S2b interface. In step 3, the PGW 118 sends a PCO response to the ePDG 122 over the S2b interface. The ePDG 122 interprets the PCO response in order to extract the DNS server address and, in step 4, sends the address to the UE 134 over the IKE-based SWu interface. In some embodiments, the DNS server address may be sent to the UE 134 as an attribute in a configuration payload or another IKEv2 payload. Thus, the ePDG 122 maps the DNS address request in IKE to the DNS address request in PCO. The ePDG 122 may also interpret and map other IKE Attributes on the SWu interface to PCO on the S2b interface.

Figure 5:
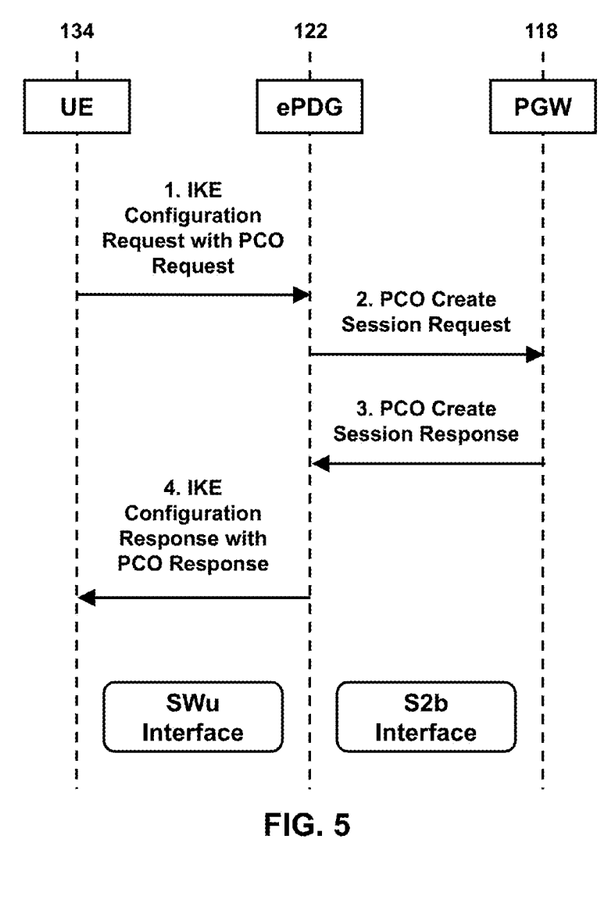

FIG. 5 illustrates systems and methods for negotiating network protocol configuration parameters in accordance with certain embodiments. In step 1, the UE 134 sends a request for the PCO parameters to the ePDG 122 via a modified IKE protocol over the SWu interface. In some embodiments, the IKEv2 configuration payload or another existing IKEv2 payload of the protocol may be redefined to include the PCO parameters as new configuration attributes. In other embodiments, the IKEv2 protocol may be modified to include a new PCO payload comprising PCO parameters. In step 2, the ePDG 122 maps the PCO request on IKE to a PCO request over the S2b interface. Then, the ePDG 122 sends the PCO request to the PGW 118, to which the PGW 118 responds in step 3. In embodiments that use a modified IKE protocol, the ePDG 122 does not need to interpret the PCO request over the SWu interface before mapping it to the PCO request over the S2b interface. Likewise, the ePDG 122 does not need to interpret the PCO response over the S2b interface before mapping it to the PCO response over the SWu interface. Thus, in step 4, the ePDG 122 sends the PCO response on IKE to the UE 134.

Figure 6:
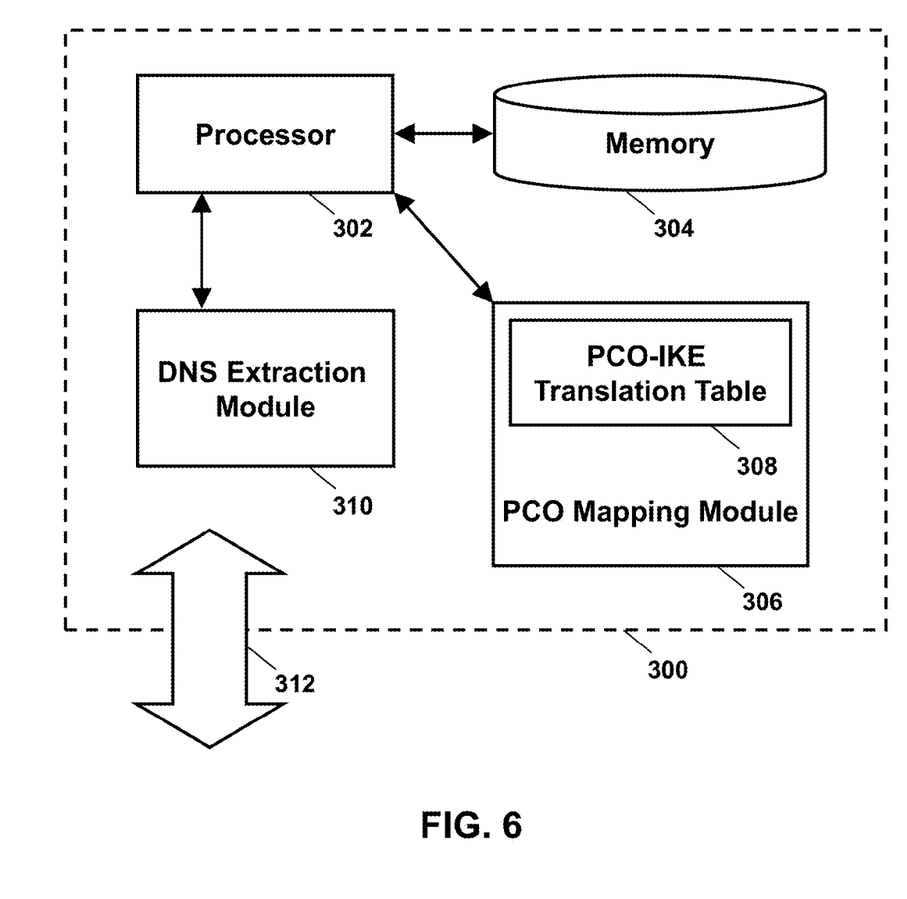
FIG. 6 illustrates a logical view of a network device in accordance with certain embodiments.
Figure 7:
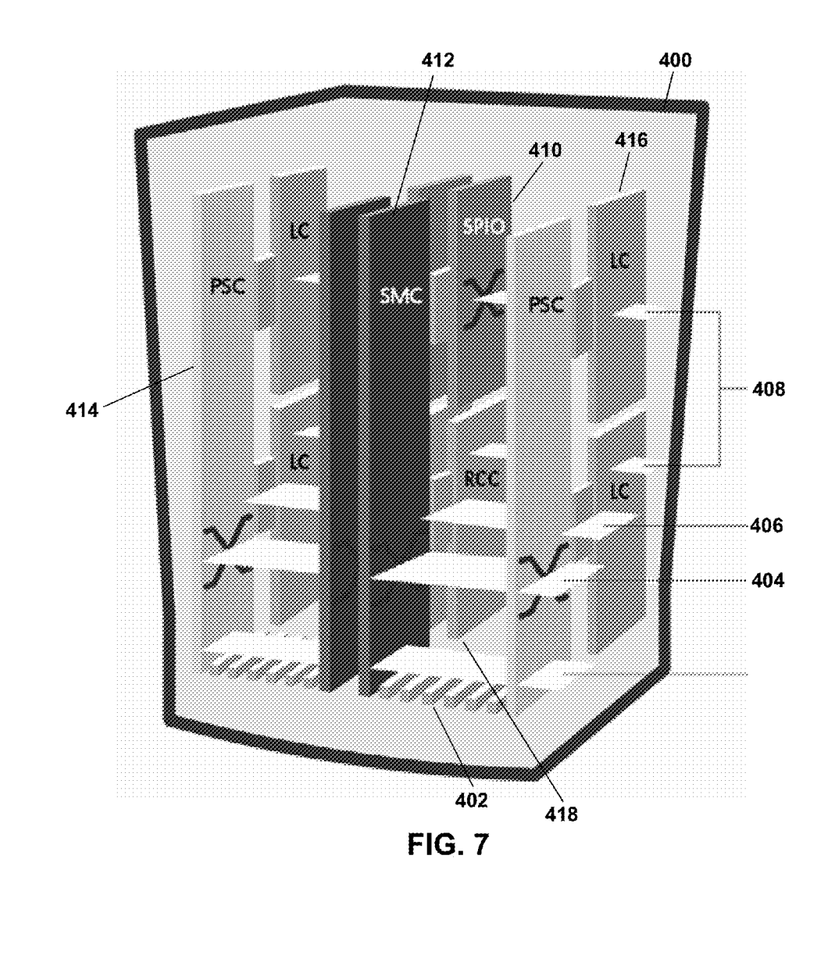
FIG. 7 illustrates a network device in accordance with certain embodiments.

FIG. 6 illustrates a logical view of a gateway 300 in accordance with certain embodiments. The gateway 300 may include a processor 302, a memory 304, a PCO mapping module 306, a PCO-IKE translation table 308, a DNS extraction module 310, and an interface 312.

A PCO mapping module 306 may provide ePDG functionalities at the gateway 300 in some embodiments. The PCO mapping module 306 may take an IKE configuration request from a UE and translate it to a PCO request for a PGW. Likewise, the PCO mapping module 306 may take a PCO response from a PGW and translate it to an IKE configuration response to a UE. A PCO-IKE translation table 308 may reside in the gateway 300, but it may also be a stand-alone device. The PCO mapping module 306 and the PCO-IKE translation table 308 may be implemented in software using the memory 304, such as a non-transient computer readable medium, a non-transitory computer readable medium, a programmable read only memory (PROM), or flash memory. The software may run on a processor 302 that executes instructions or computer code. The PCO mapping module 306 may also be implemented in hardware using an application specific integrated circuit (ASIC), programmable logic array (PLA), or any other integrated circuit.

A DNS extraction module 310 may provide additional ePDG functionalities at the gateway 300 in some embodiments. The DNS extraction module 310 may extract the DNS address request from or otherwise interpret an IKE configuration request from a UE before the PCO mapping module 306 translates it to a PCO request for a PGW. Likewise, the DNS extraction module 310 may extract the DNS address from or otherwise interpret a PCO response from a PGW before the PCO mapping module 306 inserts it into an IKE request from a UE. The DNS extraction module 310 may be implemented in software using the memory 304, such as a non-transient computer readable medium, a non-transitory computer readable medium, a programmable read only memory (PROM), or flash memory. The software may run on a processor 302 that executes instructions or computer code. The DNS extraction module 310 may also be implemented in hardware using an application specific integrated circuit (ASIC), programmable logic array (PLA), or any other integrated circuit.

An interface 312 may provide an input and/or output mechanism to communicate with other network devices. The interface 312 may provide communication with DNS servers, application servers, and user equipment, as well as other core network nodes to send and receive control data. The interface 312 can be implemented in hardware to send and receive signals in a variety of mediums, such as optical, copper, and wireless, and in a number of different protocols, some of which may be non-transient.

User Equipment and Gateway

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The exchange of network protocol configuration parameters described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data interworking function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The exchange of network protocol configuration parameters can be implemented as any combination of the following including an xGSN, an xGW, an xGW-SGW, and an xGW-PGW.

Figure 8:
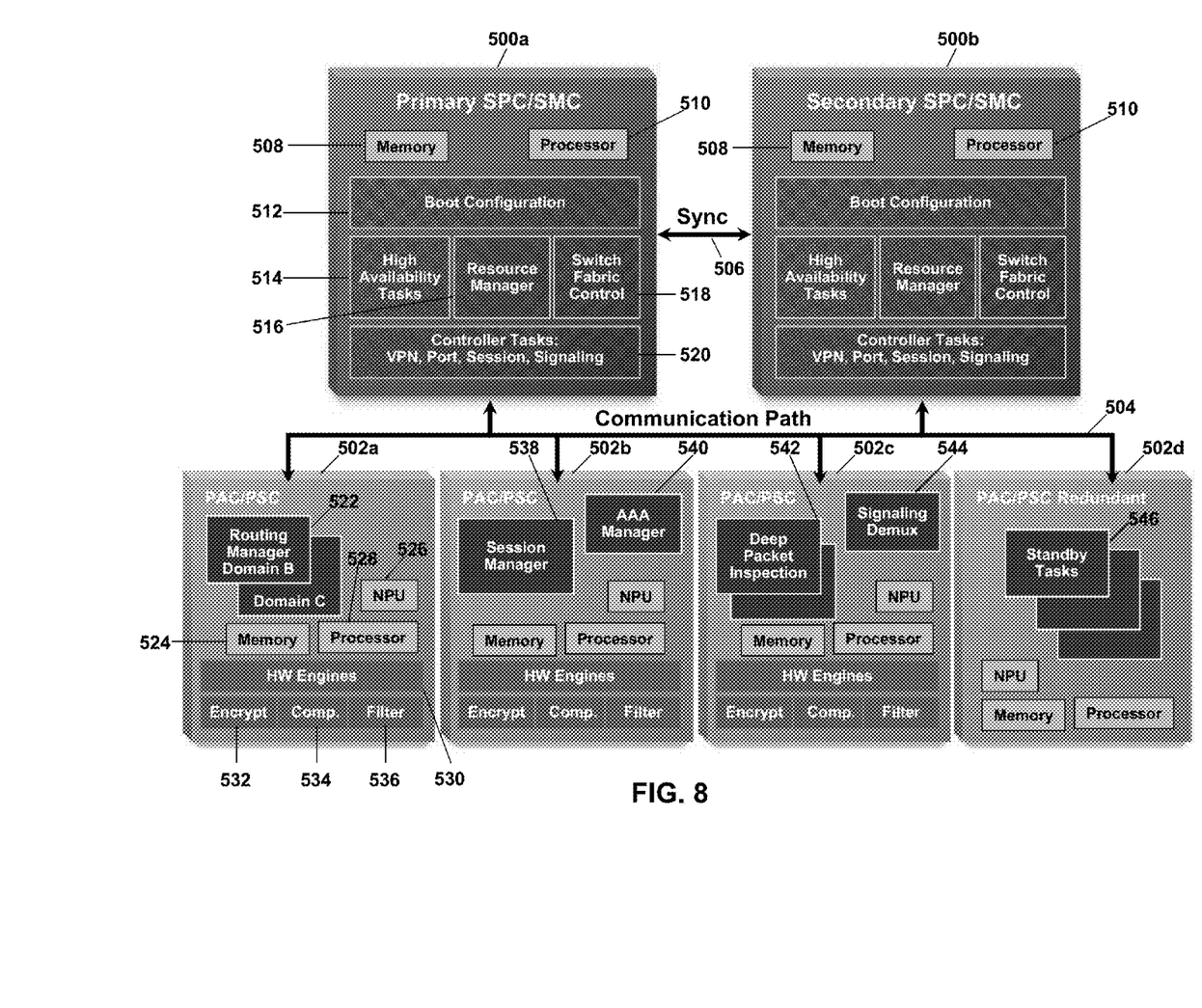
FIG. 8 illustrates a logical view of the software architecture of a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 8 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group, users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 8 illustrates a logical view of the software architecture of a network device in accordance with certain embodiments. As shown, the software and hardware can be distributed within the network device and across different circuit boards, processors, and memory. FIG. 8 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, LTE functionality such as a PDN gateway can be combined or co-located with the MME. The disclosure could also apply to trusted WiFi; in such as case, there is no SWu, but rather a mapping of DHCP and other protocols to an S2a interface. The same logic applies in that the trusted wireless access gateway (TWAG) and trusted WLAN access proxy (TWAP) in the trusted WiFi architecture map the requests from the UE to the relevant PCO field as applicable. DNS is one example, but with further IETF extensions, other request/responses could be supported.

We claim:

1. A method comprising:
receiving, at a serving gateway, a request for one or more network protocol configuration parameters associated with an Internet Protocol address of a mobile device, the one or more network protocol configuration parameters to be provided by a packet gateway, the request to be received from the mobile device over an untrusted wireless local area network (WLAN) through a first interface using a first communication protocol comprising an Internet Key Exchange (IKE) protocol, the request comprising an IKE configuration request;
the serving gateway converting the IKE configuration request into a protocol configuration option (PCO) request;
the serving gateway making the PCO request for the one or more network protocol configuration parameters to the packet gateway over a second interface;
the serving gateway receiving a first response with the one or more network protocol configuration parameters from the packet gateway over the second interface; and
providing a second response comprising the one or more network protocol configuration parameters provided by the packet gateway to the mobile device over the untrusted WLAN through the first interface using the first communication protocol;
wherein the request for one or more network protocol configuration parameters to be received at the serving gateway from the mobile device over the untrusted WLAN specifies at least one of a domain name system (DNS) server address request or a Proxy-Call Session Control Function (P-CSCF) address request.

2. The method of claim 1, wherein the request for the one or more network protocol configuration parameters includes a domain name system (DNS) query to obtain an Internet Protocol (IP) address to enable communication with the mobile device over a public communications network.

3. The method of claim 1, wherein the serving gateway includes a Serving GPRS Support Node (SGSN), a serving gateway (SGW), or an evolved packet data gateway (ePDG).

4. The method of claim 1, wherein the first interface comprises an SWu interface and the second interface comprises an S2b interface.

5. The method of claim 4, wherein providing the second response to the mobile device comprises providing the one or more network protocol configuration parameters as configuration payload attributes.

6. The method of claim 1, wherein the IKE protocol comprises Internet Key Exchange (IKE)v2.

7. The method of claim 1, wherein the request and response are provided to support password authentication protocol (PAP).

8. The method of claim 6, further comprising converting the IKE configuration request into the PCO request using a PCO mapping module in the serving gateway.

9. The method of claim 6, wherein the request for one or more network protocol configuration parameters comprises the PCO request.

10. The method of claim 9, wherein receiving the request for one or more network protocol configuration parameters comprises receiving the PCO request in a payload field, associated with the Internet Key Exchange(IKE)v2 protocol, dedicated to carry the PCO request.

11. The method of claim 6, wherein providing the second response to the mobile device comprises sending the one or more network protocol configuration parameters in a payload field, associated with the Internet Key Exchange(IKE) v2 protocol, dedicated to carry the one or more network protocol configuration parameters.

12. The method of claim 1, wherein the one or more network protocol configuration parameters requested by the mobile device over the untrusted WLAN and to be provided by the packet gateway comprise an address of a domain name system (DNS) server.

13. The method of claim 1, wherein the one or more network protocol configuration parameters requested by the mobile device over the untrusted WLAN and to be provided by the packet gateway comprise an address of a Proxy-Call Session Control Function.

14. The method of claim 1, wherein the first response with the one or more network protocol configuration parameters is a PCO response and the second response comprising the one or more network protocol configuration parameters is an Internet Key Exchange (IKE) configuration response, the method further comprising: translating, by the serving gateway, the PCO response received from the packet gateway to the IKE configuration response.

15. A serving gateway comprising:
 a first interface configured to receive, at the serving gateway using a first communication protocol comprising an Internet Key Exchange (IKE) protocol, a request for one or more network protocol configuration parameters associated with an Internet Protocol address of a mobile device, the request comprising an IKE configuration request, the one or more network protocol configuration parameters to be provided by a packet gateway, the request to be received from the mobile device over an untrusted wireless local area network (WLAN);
 a second interface configured for the serving gateway to make a PCO request for the one or more network protocol configuration parameters to the packet gateway, wherein the IKE configuration request is converted into the PCO request by the serving gateway; and
 a processor for receiving a first response comprising the one or more network protocol configuration parameters from the packet gateway over the second interface, and for providing a second response comprising the one or more network protocol configuration parameters provided by the packet gateway to the mobile device over the untrusted WLAN through the first interface using the first communication protocol;
 wherein the request for one or more network protocol configuration parameters received at the serving gateway from the mobile device over the untrusted WLAN specifies at least one of a domain name system (DNS) server address request or a Proxy-Call Session Control Function (P-CSCF) address request.

16. The gateway of claim 15, wherein the request for the one or more network protocol configuration parameters includes a domain name system (DNS) query to obtain an Internet Protocol (IP) address to enable communication with the mobile device over a public communications network.

17. The gateway of claim 15, wherein the serving gateway includes a Serving GPRS Support Node(SGSN), a serving gateway (SGW), or an evolved packet data gateway (ePDG).

18. The gateway of claim 15, wherein the first interface is an SWu interface and the second interface is an S2b interface.

19. The gateway of claim 15, wherein the IKE protocol comprises Internet Key Exchange (IKE)v2.

20. The gateway of claim 19, wherein the request for one or more network protocol configuration parameters comprises an IKE configuration request, and the processor is configured to convert the IKE configuration request into the PCO request using a PCO mapping module in the serving gateway.

21. Logic encoded on one or more tangible, non-transient media for execution and when executed operable for:
 receiving, at a serving gateway, a request for one or more network protocol configuration parameters associated with an Internet Protocol address of a mobile device, the one or more network protocol configuration parameters to be provided by a packet gateway, the request to be received from the mobile device over an untrusted wireless local area network (WLAN) through a first interface using a first communication protocol comprising an Internet Key Exchange (IKE) protocol, the request comprising an IKE configuration request;
 converting, by the serving gateway, the IKE configuration request into a protocol configuration option (PCO) request;
 making, by the serving gateway, the PCO request for the one or more network protocol configuration parameters to the packet gateway over a second interface;
 receiving, by the serving gateway, a first response with the one or more network protocol configuration parameters from the packet gateway over the second interface; and
 providing a second response comprising the one or more network protocol configuration parameters provided by the packet gateway to the mobile device over the untrusted WLAN through the first interface using the first communication protocol;
 wherein the request for one or more network protocol configuration parameters received at the serving gateway from the mobile device over the untrusted WLAN specifies at least one of a domain name system (DNS) server address request or a Proxy-Call Session Control Function (P-CSCF) address request.

22. The logic of claim 21, wherein the request for one or more network protocol configuration parameters comprises an IKE configuration request, and the logic is further operable for converting the IKE configuration request into the PCO request using a PCO mapping module in the serving gateway.

* * * * *